US012682351B2

(12) United States Patent
Ali et al.

(10) Patent No.: US 12,682,351 B2
(45) Date of Patent: *Jul. 14, 2026

(54) METHOD AND SYSTEM FOR PAYMENT CARD AUTHENTICATION

(71) Applicant: JPMorgan Chase Bank, N.A., New York, NY (US)

(72) Inventors: Syed Rizwan Ali, Aston, PA (US); Ankita Mehta, Hamilton, NJ (US); Vandana S Dubay, Chadds Ford, PA (US); Neela Mukherjee, Newark, DE (US); A K M Nazmus Sakib, Newark, DE (US); Marc Dilodovico, Chadds Ford, PA (US); Robert Crooks, Princeton, NJ (US); Howard Spector, Woolwich, NJ (US); John L Oliver, III, Smyrna, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/604,745

(22) Filed: Mar. 14, 2024

(65) Prior Publication Data

US 2024/0220987 A1      Jul. 4, 2024

Related U.S. Application Data

(62) Division of application No. 17/445,240, filed on Aug. 17, 2021, now Pat. No. 11,961,080.

(Continued)

(51) Int. Cl.
*G06Q 20/40* (2012.01)
*G06Q 20/32* (2012.01)

(52) U.S. Cl.
CPC ... *G06Q 20/40145* (2013.01); *G06Q 20/3278* (2013.01); *G06Q 20/405* (2013.01); *G06Q 20/409* (2013.01)

(58) Field of Classification Search
CPC ............................................... G06Q 20/00–425
See application file for complete search history.

(56) References Cited

U.S. PATENT DOCUMENTS 7,715,593 B1      5/2010 Adams et al.
9,195,984 B1      11/2015 Spector et al.
(Continued)

FOREIGN PATENT DOCUMENTS

EP            3955144 A1      2/2022

OTHER PUBLICATIONS

Extended European Search report issued in European Application No. 22167410.4, dated Sep. 9, 2022.

*Primary Examiner* — Chenyuh Kuo
(74) *Attorney, Agent, or Firm* — GREENBLUM & BERNSTEIN, P.L.C.

(57) ABSTRACT

Method and systems for securely and accurately authenticating a payment card by using biometric information associated with an authorized user is provided. The method may be implemented by providing a payment card that includes a processor; a display area coupled to the processor and configured to hide account information when the payment card has not been authenticated and to display the account information for a predetermined time interval when the payment card is authenticated; a sensor coupled to the processor and configured to capture biometric information of a user; and a communication interface coupled to the processor and configured to facilitate wireless communication with a mobile smart phone.

19 Claims, 6 Drawing Sheets

Related U.S. Application Data

(60) Provisional application No. 63/173,168, filed on Apr. 9, 2021.

(56) References Cited

U.S. PATENT DOCUMENTS

| | | | | |
|---|---|---|---|---|
| 9,665,818 | B1 * | 5/2017 | Cardinal | G06K 19/0704 |
| 10,614,446 | B2 * | 4/2020 | Zarakas | G06K 19/0704 |
| 11,004,074 | B1 * | 5/2021 | Hiccox | G06K 19/06187 |
| 11,037,139 | B1 * | 6/2021 | Ho | G06Q 20/352 |
| 11,315,116 | B2 * | 4/2022 | Goldschmidt | G06Q 20/202 |
| 11,961,080 | B2 * | 4/2024 | Ali | G06Q 20/405 |
| 2007/0073619 | A1 * | 3/2007 | Smith | G07C 9/257 |
| | | | | 705/41 |
| 2008/0029608 | A1 | 2/2008 | Kellum et al. | |
| 2015/0262052 | A1 | 9/2015 | Pahuja | |
| 2017/0278095 | A1 | 9/2017 | Heeter et al. | |
| 2021/0034834 | A1 | 2/2021 | Mackin et al. | |
| 2021/0334614 | A1 * | 10/2021 | Louis | G06Q 20/409 |

\* cited by examiner

400

600

METHOD AND SYSTEM FOR PAYMENT CARD AUTHENTICATION

CROSS-REFERENCE TO RELATED APPLICATIONS

This application is a divisional of U.S. application Ser. No. 17/445,240, filed Aug. 17, 2021, which claims the benefit of U.S. Provisional Patent Application Ser. No. 63/173,168, filed Apr. 9, 2021, each of which is hereby incorporated by reference in its respective entirety.

BACKGROUND

1. Field of the Disclosure

This technology generally relates to methods and systems for authenticating a payment card, and more particularly to methods and systems for securely and accurately authenticating a payment card by using biometric information associated with an authorized user.

2. Background Information

Unauthorized and/or fraudulent use of payment cards is an ongoing problem that causes a significant amount of financial loss to both consumers and financial institutions. Conventionally, many financial institutions use various strategies for fraud prevention, including blocking an execution of a transaction that is deemed suspicious based on a transaction history of a cardholder.

However, such strategies are limited in both security and accuracy. With respect to security, when an unauthorized user uses a payment card to conduct a transaction that is not deemed suspicious, the transaction will not be blocked, thus facilitating the fraud. With respect to accuracy, when an authorized user attempts to conduct a transaction that is not fraudulent but appears to be suspicious, the transaction may be blocked, thereby causing unnecessary delay and inconvenience to the cardholder.

Accordingly, there is a need for a secure and accurate methodology for authenticating a use of a payment card.

SUMMARY

The present disclosure, through one or more of its various aspects, embodiments, and/or specific features or sub-components, provides, inter alia, various systems, servers, devices, methods, media, programs, and platforms for securely and accurately authenticating a payment card by using biometric information associated with an authorized user.

According to an aspect of the present disclosure, a method for securely and accurately authenticating a payment card by using biometric information associated with an authorized user is provided. The method is implemented by at least one processor. The method includes: receiving, by the at least one processor, a request for a proposed transaction to be executed by using a payment card; capturing, by the at least one processor, biometric information from a user; comparing, by the at least one processor, the captured biometric information with stored information that relates to a predetermined person; when the captured biometric information is determined as matching the stored information, authenticating, by the at least one processor, a use of the payment card for the proposed transaction; and when the captured biometric information is determined as not matching the stored information, denying, by the at least one processor, the request for the proposed transaction.

The capturing of the biometric information may include at least one from among capturing a fingerprint of the user, capturing a facial image of the user, capturing an iris scan of the user, capturing a heat signature of the user, capturing a motion of the user, and capturing a relative orientation of the user by using a gyroscope.

When the use of the payment card is authenticated, the method may further include: causing the authentication to expire after an elapsement of a first predetermined time interval; and disabling the use of the payment card when the authentication has expired.

The method may further include receiving a user input that relates to specifying an amount of time as the first predetermined time interval.

The method may further include: causing account information that relates to the payment card to not be visible on a face of the payment card; and when the use of the payment card for the proposed transaction is authenticated, causing the account information to be visible on the face of the payment card for a second predetermined time interval.

The account information may include at least one from among a cardholder name, an account number, an expiration date of the payment card, and a security code associated with the payment card.

The second predetermined time interval may be less than or equal to 60 seconds.

The method may further include comparing first account data stored on a mobile smart phone with the account information that relates to the payment card, and validating the first account data based on a result of the comparing.

According to another exemplary embodiment, a computing apparatus for authenticating a payment card by using biometric information associated with an authorized user is provided. The computing apparatus includes a processor; a memory; and a communication interface coupled to each of the processor and the memory. The processor is configured to: receive, via the communication interface, a request for a proposed transaction to be executed by using a payment card; capture biometric information from a user; compare the captured biometric information with stored information that relates to a predetermined person; when the captured biometric information is determined as matching the stored information, authenticate a use of the payment card for the proposed transaction; and when the captured biometric information is determined as not matching the stored information, deny the request for the proposed transaction.

The processor may be further configured to capture, as the biometric information, at least one from among a fingerprint of the user, a facial image of the user, an iris scan of the user, a heat signature of the user, a motion of the user, and a relative orientation of the user as indicated by a gyroscope.

When the use of the payment card is authenticated, the processor may be further configured to: cause the authentication to expire after an elapsement of a first predetermined time interval; and disable the use of the payment card when the authentication has expired.

The processor may be further configured to receive, via the communication interface, a user input that relates to specifying an amount of time as the first predetermined time interval.

The processor may be further configured to: cause account information that relates to the payment card to not be visible on a face of the payment card; and when the use of the payment card for the proposed transaction is authenticated, cause the account information to be visible on the face of the payment card for a second predetermined time interval.

The account information may include at least one from among a cardholder name, an account number, an expiration date of the payment card, and a security code associated with the payment card.

The second predetermined time interval may be less than or equal to 60 seconds.

The processor may be further configured to: compare first account data stored on a mobile smart phone with the account information that relates to the payment card; and validate the first account data based on a result of the comparison.

According to another exemplary embodiment, a payment card for executing a transaction by using an account is provided. The payment card includes: a processor; a display area coupled to the processor and configured to hide account information when the payment card has not been authenticated and to display the account information for a predetermined time interval when the payment card is authenticated; a sensor coupled to the processor and configured to capture biometric information of a user; and a communication interface coupled to the processor and configured to facilitate wireless communication with a mobile smart phone. The processor is configured to: transmit, via the communication interface, a request for a proposed transaction to be executed by using the payment card to the mobile smart phone; transmit, via the communication interface, the captured biometric information to the mobile smart phone; receive, via the communication interface, an authentication for a use of the payment card for executing the proposed transaction; and cause the display area to display the account information for the predetermined interval of time based on the received authentication.

The sensor may include at least one from among a fingerprint scanner, a camera configured to capture a facial image, an iris scanner, a heat signature reader, a pressure point reader, a motion sensor, and a gyroscope.

The communication interface may include at least one from among a Bluetooth chip, a near field communication (NFC) chip, and a radio frequency identification (RFID) chip.

The payment card may further include a charging cell configured to wirelessly generate power for consumption by the payment card.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
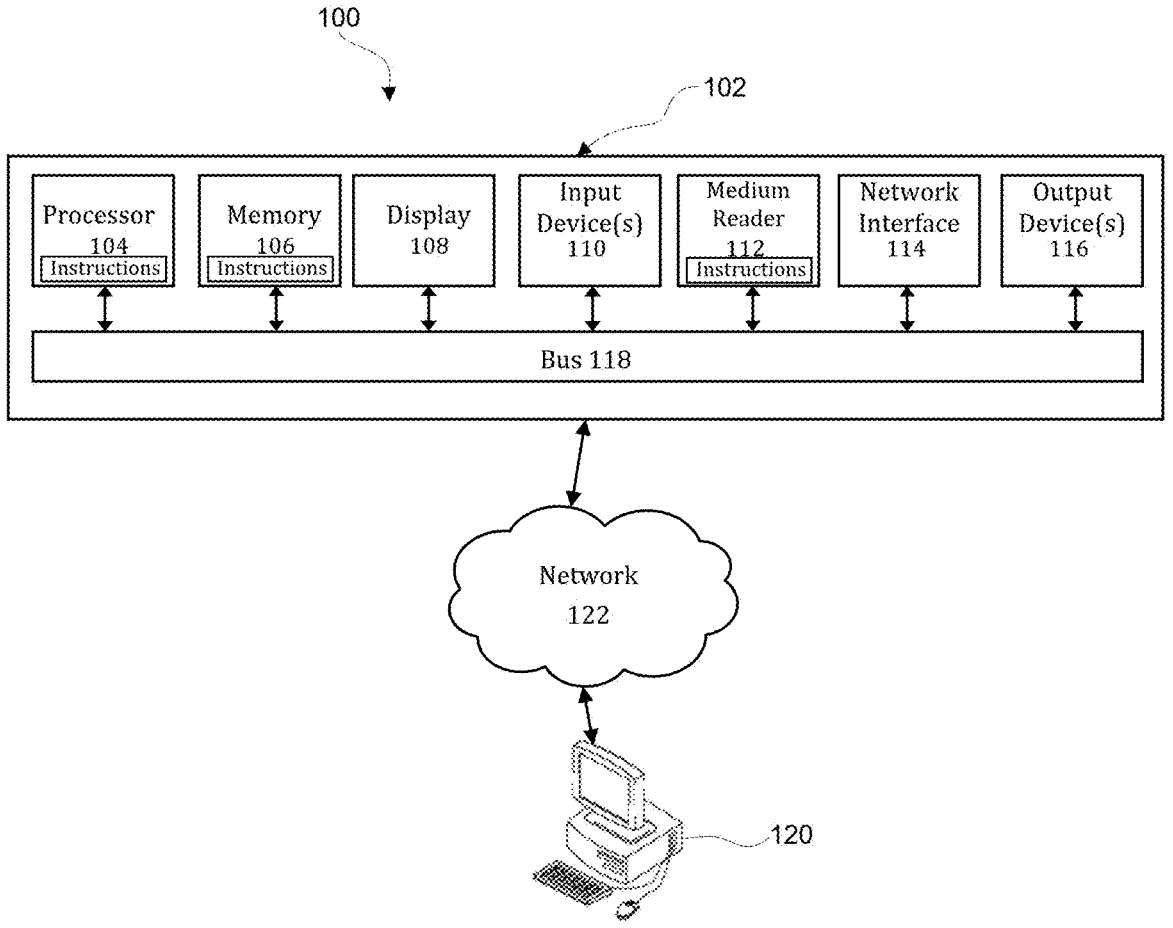
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for securely and accurately authenticating a payment card by using biometric information associated with an authorized user.

Figure 2:
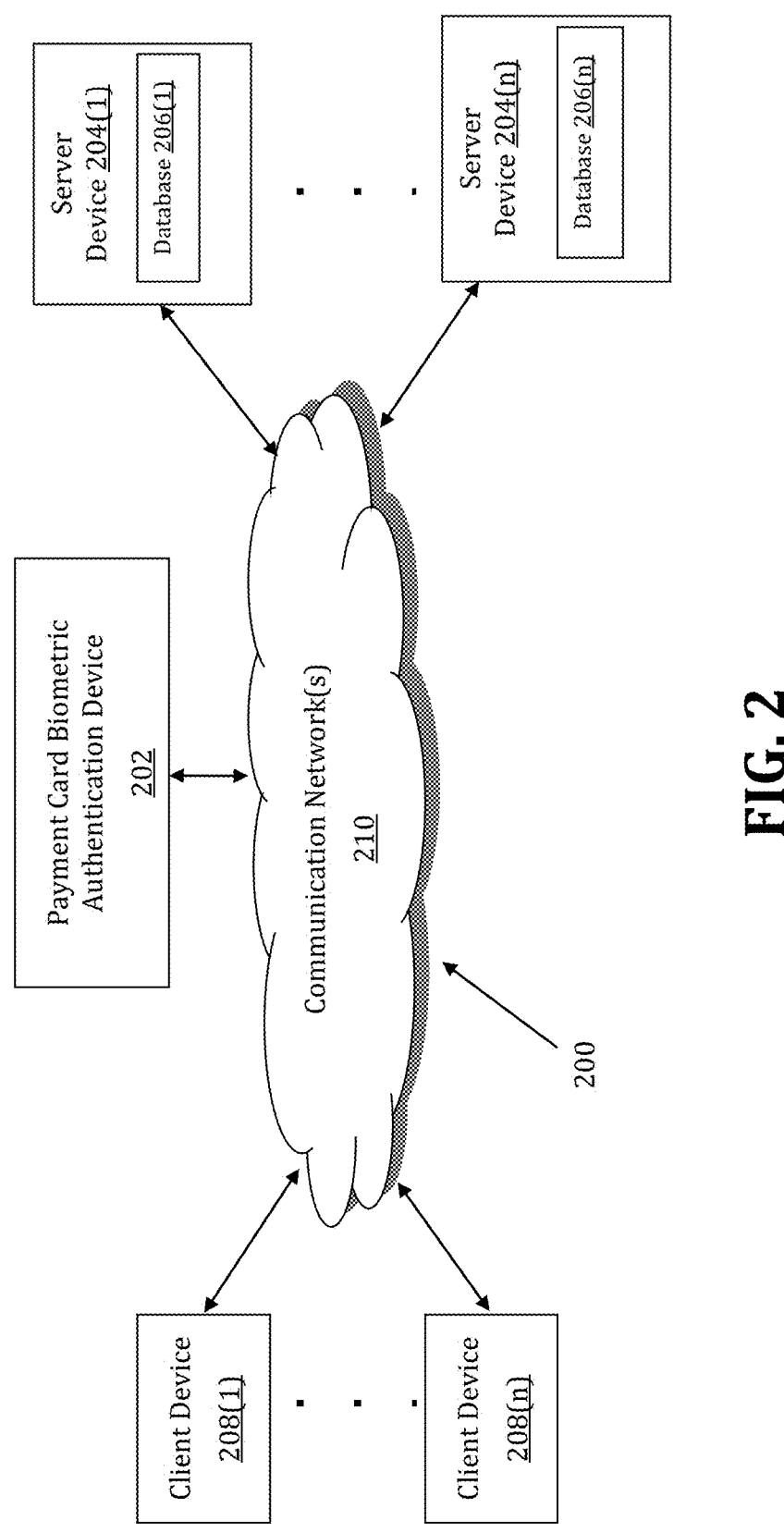
FIG. 2 illustrates an exemplary diagram of a network environment.

Referring to FIG. 2, a schematic of an exemplary network environment 200 for implementing a method for securely and accurately authenticating a payment card by using biometric information associated with an authorized user is illustrated. In an exemplary embodiment, the method is executable on any networked computer platform, such as, for example, a personal computer (PC).

The method for securely and accurately authenticating a payment card by using biometric information associated with an authorized user may be implemented by a Payment Card Biometric Authentication (PCBA) device 202. The PCBA device 202 may be the same or similar to the computer system 102 as described with respect to FIG. 1. The PCBA device 202 may store one or more applications that can include executable instructions that, when executed by the PCBA device 202, cause the PCBA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PCBA device 202 itself, may be located in virtual server(s) running in a cloud-based computing environment rather than being tied to one or more specific physical network computing devices. Also, the application(s) may be running in one or more virtual machines (VMs) executing on the PCBA device 202. Additionally, in one or more embodiments of this technology, virtual machine(s) running on the PCBA device 202 may be managed or supervised by a hypervisor.

In the network environment 200 of FIG. 2, the PCBA device 202 is coupled to a plurality of server devices 204(1)-204(n) that hosts a plurality of databases 206(1)-206(n), and also to a plurality of client devices 208(1)-208(n) via communication network(s) 210. A communication interface of the PCBA device 202, such as the network interface

114 of the computer system 102 of FIG. 1, operatively couples and communicates between the PCBA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PCBA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PCBA devices that efficiently implement a method for securely and accurately authenticating a payment card by using biometric information associated with an authorized user.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PCBA device 202 may be a standalone device or integrated with one or more other devices or apparatuses, such as one or more of the server devices 204(1)-204(n), for example. In one particular example, the PCBA device 202 may include or be hosted by one of the server devices 204(1)-204(n), and other arrangements are also possible. Moreover, one or more of the devices of the PCBA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PCBA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to user-specific biometric data that is usable for authenticating a user of a payment card.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the PCBA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PCBA device 202 via the communication network(s) 210 in order to communicate user requests and information. The client devices 208(1)-208(n) may further include, among other features, a display device, such as a display screen or touchscreen, and/or an input device, such as a keyboard, for example. The client devices 208(1)-208 (n) may also include a payment card that has a mechanism for capturing biometric data of a person that is handling the payment card.

Although the exemplary network environment 200 with the PCBA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PCBA device 202, the server devices 204(1)-204(n), or the client devices 208(1)-208(n), for example, may be configured to operate as virtual instances on the same physical machine. In other words, one or more of the PCBA device 202, the server devices 204 (1)-204(n), or the client devices 208(1)-208(n) may operate on the same physical device rather than as separate devices communicating through communication network(s) 210. Additionally, there may be more or fewer PCBA devices

202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
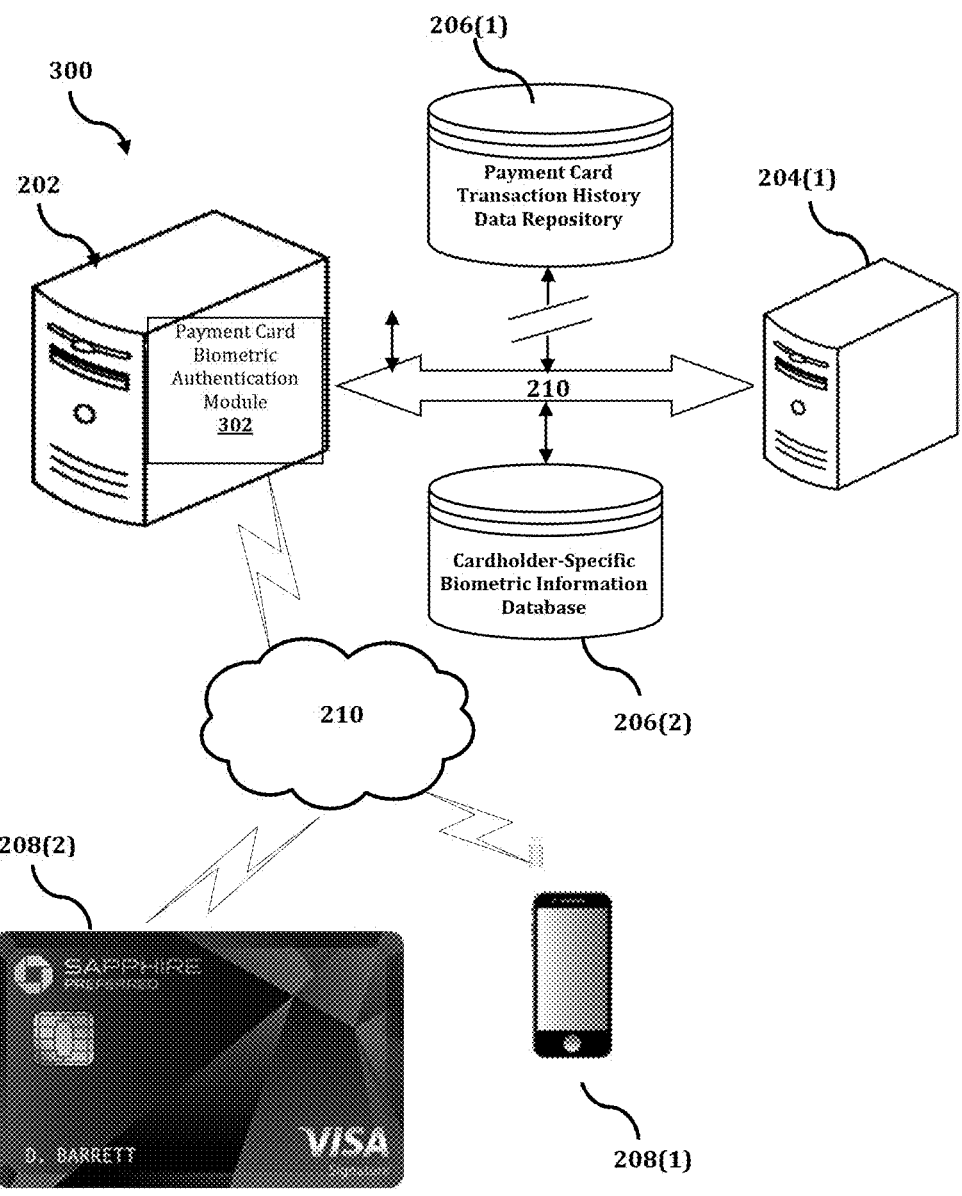
FIG. 3 shows an exemplary system for implementing a method for securely and accurately authenticating a payment card by using biometric information associated with an authorized user.

The PCBA device 202 is described and illustrated in FIG. 3 as including a payment card biometric authentication module 302, although it may include other rules, policies, modules, databases, or applications, for example. As will be described below, the payment card biometric authentication management module 302 is configured to implement a method for securely and accurately authenticating a payment card by using biometric information associated with an authorized user.

An exemplary process 300 for implementing a mechanism for securely and accurately authenticating a payment card by using biometric information associated with an authorized user by utilizing the network environment of FIG. 2 is illustrated as being executed in FIG. 3. Specifically, a first client device 208(1) and a second client device 208(2) are illustrated as being in communication with PCBA device 202. In this regard, the first client device 208(1) and the second client device 208(2) may be "clients" of the PCBA device 202 and are described herein as such. Nevertheless, it is to be known and understood that the first client device 208(1) and/or the second client device 208(2) need not necessarily be "clients" of the PCBA device 202, or any entity described in association therewith herein. Any additional or alternative relationship may exist between either or both of the first client device 208(1) and the second client device 208(2) and the PCBA device 202, or no relationship may exist.

Further, PCBA device 202 is illustrated as being able to access a payment card transaction history data repository 206(1) and a cardholder-specific biometric information database 206(2). The autonomous investment portfolio management module 302 may be configured to access these databases for implementing a method for securely and accurately authenticating a payment card by using biometric information associated with an authorized user.

The first client device 208(1) may be, for example, a smart phone. Of course, the first client device 208(1) may be any additional device described herein. The second client device 208(2) may be, for example, a payment card that is Bluetooth enabled and also includes a mechanism for capturing biometric data. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PCBA device 202 via broadband or cellular communication. Of course, these embodiments are merely exemplary and are not limiting or exhaustive.

Upon being started, the payment card biometric authentication module 302 executes a process for securely and accurately authenticating a payment card by using biometric information associated with an authorized user. An exemplary process for securely and accurately authenticating a payment card by using biometric information associated with an authorized user is generally indicated at flowchart 400 in FIG. 4.

Figure 4:
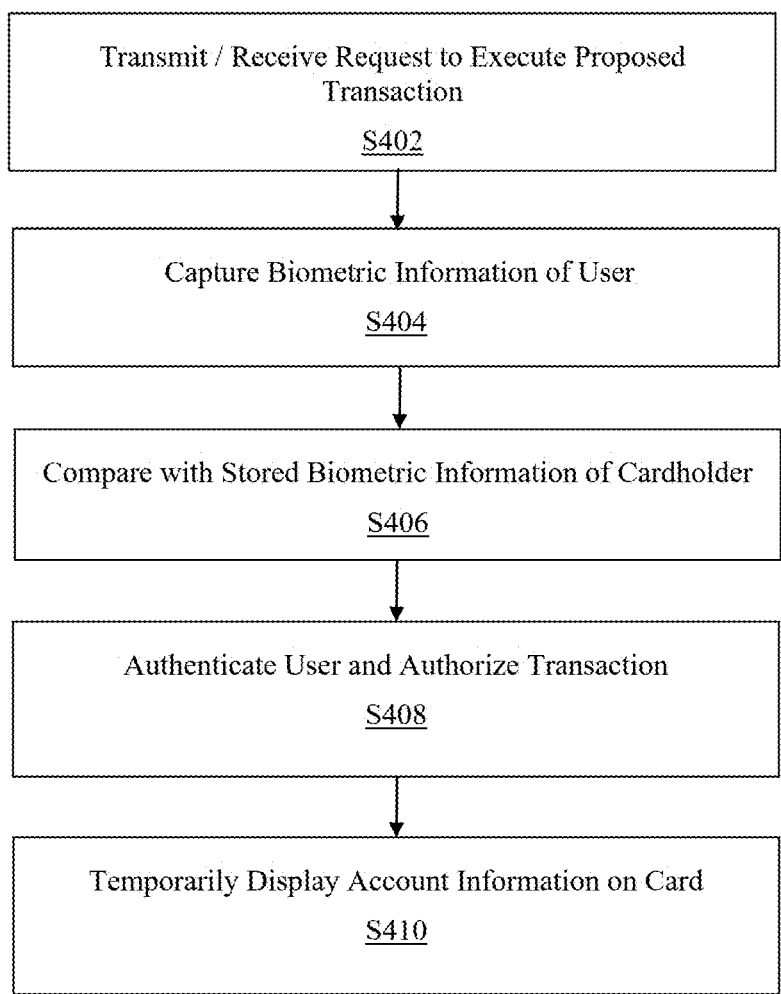
FIG. 4 is a flowchart of an exemplary process for implementing a method for securely and accurately authenticating a payment card by using biometric information associated with an authorized user.

In process 400 of FIG. 4, at step S402, a request to execute a proposed transaction by using a payment card is transmitted and received. In an exemplary embodiment, the payment card is swiped, dipped, or tapped at a point-of-sale device in order to generate the request, which is then transmitted to the payment card biometric authentication module 302. Alternatively, the payment card may include a Bluetooth chip, a near-field communication (NFC) chip, or a radio frequency identification (RFID) chip, any of which may be used to transmit the request to a mobile smart phone or other suitable device that is located within range of the payment card.

At step S404, biometric information of a user of the payment card is captured. In an exemplary embodiment, the payment card includes a sensor, such as, for example, any one or more of a fingerprint scanner, a camera, an iris scanner, a heat signature reader, a motion sensor, a gyroscope, and/or a pressure point reader. The camera may be usable for capturing a facial image of the user for purposes of performing a facial recognition operation. The payment card may use a motion sensor, a gyroscope, or a similar capture device to monitor the user's overall movement to determine who is in possession of the card. This would then generate a score indicating an amount of time that a person with a particular movement profile has been in possession of the payment card.

In an alternative exemplary embodiment, the biometric information of the user may be captured by using another device that is different from the payment card. For example, a mobile smart phone and/or a cellular telephone may be used to capture a fingerprint of the user, a facial image of the user, and/or other types of biometric information. In this circumstance, the payment card biometric authentication module 302 may be configured to recognize that the user's payment card is associated with a particular mobile smart phone to be used for capturing the user's biometric information. In addition, other types of devices that are equipped with biometric sensors may be used for capturing the biometric information. For example, a vehicle, such as an automobile, a motorcycle, or a bicycle, and/or a device that is connected to an Internet of Things (IOT) network may be usable for capturing the biometric information.

At step S406, the payment card biometric authentication module 302 compares the captured biometric information with previously stored biometric information that is associated with at least one authorized cardholder. In this aspect, when the present user of the payment card is the same person as the authorized cardholder for whom biometric information has previously been stored, the captured biometric information will match the previously stored information, and then, at step S408, the user is authenticated and the proposed transaction is authorized. However, when the comparison between the captured biometric information and the stored biometric information results in a non-match, then the request to execute the proposed transaction may be denied by the payment card biometric authentication module 302.

In an exemplary embodiment, the captured biometric information may be usable for authenticating the user for a predetermined amount of time, such that after the predetermined amount of time elapses, the ability to execute the proposed transaction expires, and the payment card is disabled. The predetermined amount of time may be user configurable, i.e., the user may be able to specify an amount of time based on convenience and security. For example, if the user would like to enable the payment card in advance of a shopping excursion, the user may provide an input of one hour, two hours, or longer, so that the payment card can be conveniently used throughout the excursion without a need for additional user authentications and/or transaction authorizations. Conversely, if the user is ready to execute a transaction and is not expecting to make any additional transactions in the near future, the user may provide an input of 5 minutes, 60 seconds, or 15 seconds, in order to ensure that the payment card is usable for only a short time, thereby increasing security.

When the user has been authenticated at step S408, then, at step S410, the payment card biometric authentication module 302 causes account information to become visible on a face of the payment card for a predetermined interval of time. In this aspect, the payment card may include a display that is generally blank, such that the account information is generally not visible, but is able to become visible based on the authentication of the user. The predetermined interval of time may be selected in advance so as to balance security with consumer convenience. For example, the predetermined interval of time may be 60 seconds, 5 minutes, 10 minutes, one hour, or any other suitable amount of time.

Figure 5:
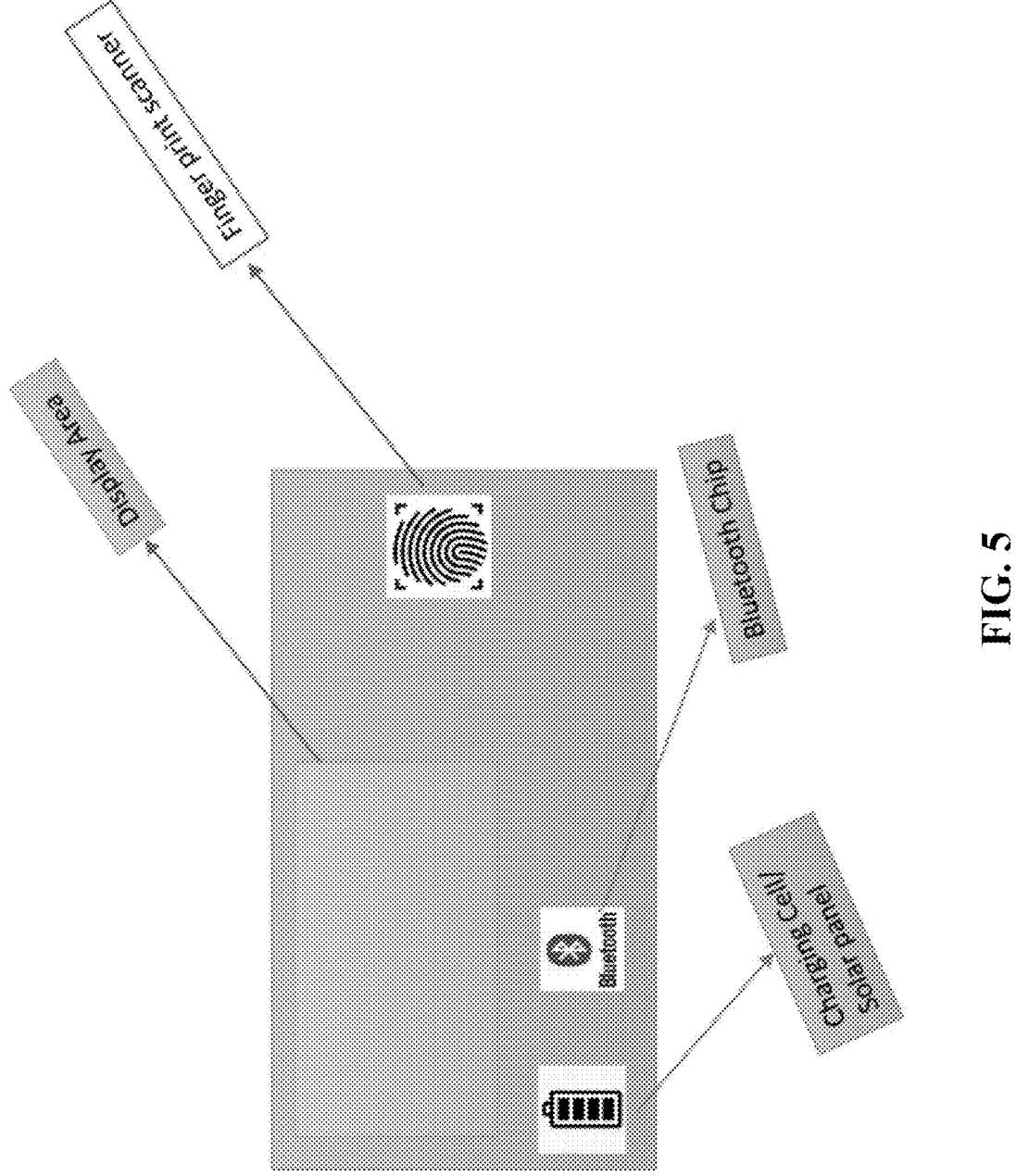
FIG. 5 is a component diagram of a payment card that implements a method for securely and accurately authenticating a payment card by using biometric information associated with a user, according to an exemplary embodiment.

FIG. 5 is a component diagram 500 of a payment card that implements a method for securely and accurately authenticating a payment card by using biometric information associated with a user, according to an exemplary embodiment. As illustrated in the component diagram 500, the payment card includes a display area that appears blank; a fingerprint scanner; a charging cell/solar panel; and a Bluetooth chip. In an exemplary embodiment, in a default mode, the display area is intentionally blank for security purposes.

The fingerprint scanner is configured to enable a user of the payment card to use a finger to provide biometric information to be used for authenticating the user. In other exemplary embodiments, the payment card may include other types of sensors, such as, for example, a camera configured to capture a facial image of the user, a heat signature reader, an iris scanner, and/or a pressure point reader, The Bluetooth chip acts as a communication interface to enable communications with other devices, such as mobile smart phones and/or point-of-sale devices. In other exemplary embodiments, the payment card may include other types of communication interfaces, such as a near-field communication (NFC) chip and/or a radio frequency identification (RFID) chip. The charging cell is configured to generate power to be consumed by the payment card in order to perform the functions of capturing biometric information and communicating with other devices.

Figure 6:
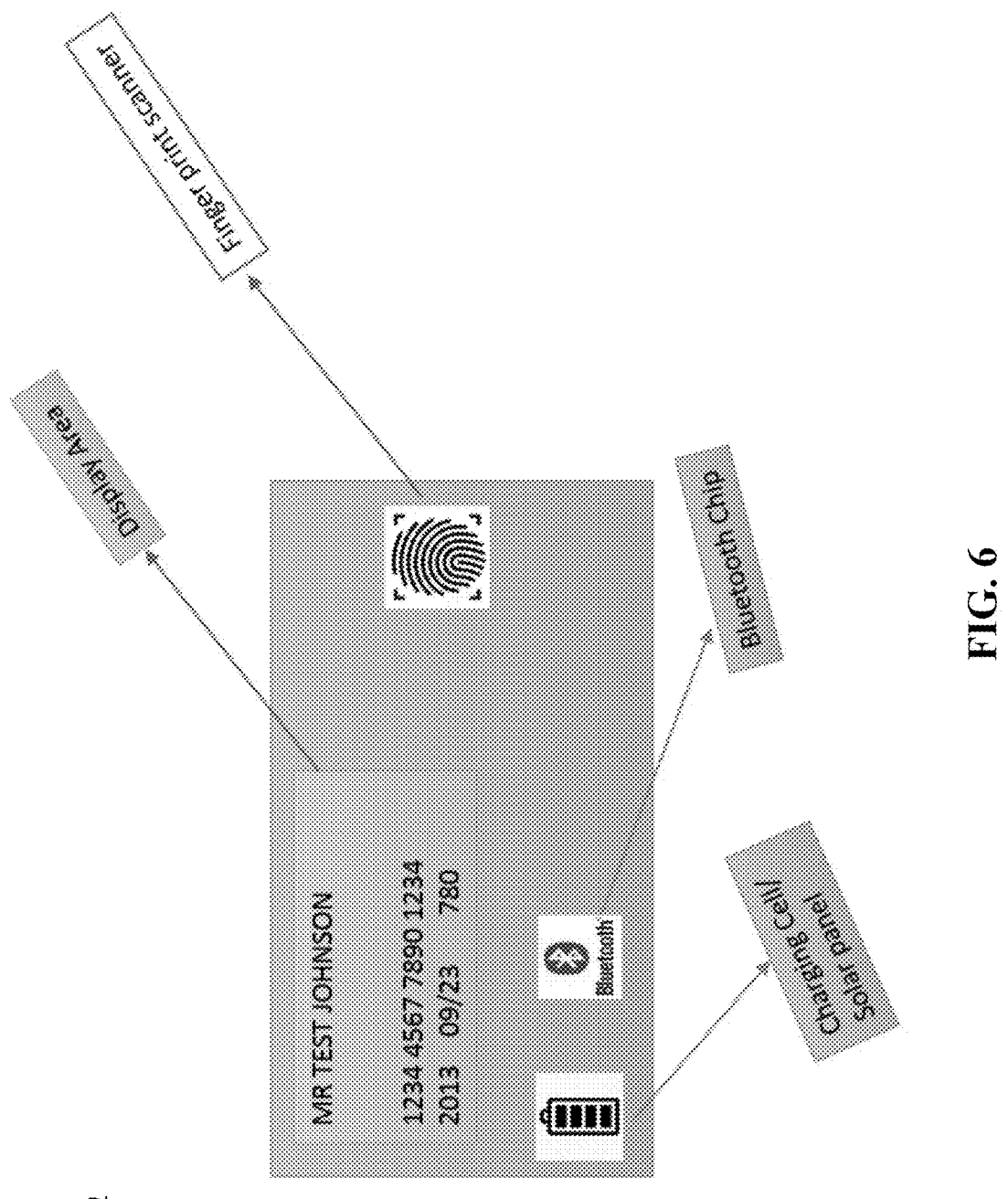
FIG. 6 is a diagram that illustrates the payment card of FIG. 5 with a display of card information that is provided as a result of a successful authentication, according to an exemplary embodiment.

FIG. 6 is a diagram 600 that illustrates the payment card of FIG. 5 with a display of card information that is provided as a result of a successful authentication, according to an exemplary embodiment. As illustrated in the diagram 600, when the user of the payment card has been authenticated as a result of a successful verification that the captured biometric information matches the previously stored biometric information of an authorized cardholder, the display area is enabled to display account information that relates to the payment card for a predetermined time interval. In an exemplary embodiment, the account information may include a name of the authorized cardholder, an account number, an expiration date, and a security code, and/or any other types of account information deemed suitable for temporary display in conjunction with an execution of a transaction.

Accordingly, with this technology, an optimized process for securely and accurately authenticating a payment card by using biometric information associated with an authorized user is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A system for executing a transaction by using an account, the system comprising:

a payment card; and a payment card biometric authenticator, wherein the payment card comprises:

a display area configured to hide account information when the payment card has not been authenticated and to display the account information for a predetermined time interval when the payment card is authenticated;

a sensor configured to capture biometric information of a user; and a communication interface configured to facilitate wireless communication with the payment card biometric authenticator and transmit a first request for a first proposed transaction to a mobile smart phone, wherein the first proposed transaction is to be executed by using the payment card, wherein the payment card biometric authenticator is configured to:

receive the first request for the first proposed transaction to be executed by using the payment card, wherein the payment card biometric authenticator stores account information of an authorized user;

receive, via the communication interface, the captured biometric information including first biometric information of a first user;

determine whether the first biometric information of the first user matches biometric information of the authorized user stored in a database by comparing the first biometric information of the first user with the stored biometric information of the authorized user;

based on a determination that the first biometric information of the first user matches the stored biometric information of the authorized user, authenticate a first use of the payment card for the first proposed transaction by authorizing the first request for the first proposed transaction;

transmit the authentication of the first use of the payment card for the first proposed transaction to the payment card to authorize the displaying of the account information of the authorized user for a predetermined time interval; and compare first account data stored on the mobile smart phone with the account information that relates to the payment card, wherein the comparing of the first account data further comprises validating the first account data; and wherein the payment card is configured to:

receive, via the communication interface, the authentication of the first use of the payment card to execute the first proposed transaction; and cause the display area to display the account information for the predetermined interval of time based on the received authentication.

2. The system of claim 1, wherein the sensor comprises at least one from among a fingerprint scanner, a camera configured to capture a facial image, an iris scanner, a heat signature reader, a pressure point reader, a motion sensor, and a gyroscope.

3. The system of claim 1, wherein the communication interface comprises at least one from among a Bluetooth chip, a near field communication (NFC) chip, and a radio frequency identification (RFID) chip.

4. The system of claim 1, wherein the payment card further comprises a charging cell configured to wirelessly generate power for consumption by the payment card.

5. The system of claim 1, wherein when the use of the payment card is authenticated, the payment card biometric authenticator is further configured to:

cause the authentication to expire after an elapsement of the predetermined time interval; and disable the use of the payment card when the authentication has expired.

6. The system of claim 5, wherein the payment card biometric authenticator is further configured to receive, via the communication interface, a user input that relates to specifying an amount of time as the predetermined time interval.

7. The system of claim 1, wherein the account information includes at least one from among a cardholder name, an account number, an expiration date of the payment card, and a security code associated with the payment card.

8. The system of claim 1, wherein the predetermined time interval is less than or equal to 60 seconds.

9. The system of claim 1, wherein the payment card is further configured to:

capture, via the sensor, a second biometric data of a second user for a second request for a second proposed transaction; and display, via the display area, no account information of the authorized user based on a denied second request, wherein the payment card biometric authenticator is further configured to:

receive the second request for the second proposed transaction;

determine that the captured second biometric data of the second user does not match the stored biometric information of the authorized user; and based on the determination that the captured second biometric data of the second user does not match the stored biometric information of the authorized user, deny the second request for the second proposed transaction, wherein the denying of the second request further comprises causing the account information of the authorized user not to be visible on the display area of the payment card.

10. A method for executing a transaction by using an account of a system that includes a payment card and a payment card biometric authenticator, the method comprising:

capturing, by a sensor of the payment card, biometric information of a user;

facilitating, by a communication interface of the payment card, wireless communication between the payment card and a mobile smart phone;

receiving, by the payment card biometric authenticator, a first request for a first proposed transaction to be executed by using the payment card, wherein the payment card biometric authenticator stores account information of an authorized user;

transmitting, by the communication interface of the payment card, the first request for the first proposed transaction to the mobile smart phone wherein the first proposed transaction is to be executed by using the payment card;

receiving, from the payment card by the payment card biometric authenticator via the communication interface of the payment card, the captured biometric information including first biometric information of a first user;

determining, by the payment card biometric authenticator, whether the first biometric information of the first user matches biometric information of the authorized user stored in a database by comparing the first biometric information of the first user with the stored biometric information of the authorized user;

based on a determination that the first biometric information of the first user matches the stored biometric information of the authorized user, authenticating, by the payment card biometric authenticator, a first use of the payment card for the first proposed transaction by authorizing the first request for the first proposed transaction;

transmitting, by the payment card biometric authenticator, the authentication of the first use of the payment card for the first proposed transaction to the payment card to authorize the displaying of the account information of the authorized user for a predetermined time interval; and comparing, by the payment card biometric authenticator, first account data stored on the mobile smart phone with the account information that relates to the payment card, wherein the comparing of the first account data further comprises validating the first account data;

receiving, by the payment card from the payment card biometric authenticator via the communication interface of the payment card, the authentication of the first use of the payment card to execute the first proposed transaction; and displaying, by a display area of the payment card, the account information for the predetermined time interval based on the receiving of the authentication, and wherein the display area hides the account information when the payment card has not been authenticated.

11. The method of claim 10, wherein the sensor comprises at least one from among a fingerprint scanner, a camera configured to capture a facial image, an iris scanner, a heat signature reader, a pressure point reader, a motion sensor, and a gyroscope.

12. The method of claim 10, wherein the communication interface of the payment card comprises at least one from among a Bluetooth chip, a near field communication (NFC) chip, and a radio frequency identification (RFID) chip.

13. The method of claim 10, wherein the payment card comprises a charging cell configured to wirelessly generate power for consumption by the payment card.

14. The method of claim 10, wherein when the use of the payment card is authenticated, the method further comprising:

causing, by the payment card biometric authenticator, the authentication to expire after an elapsement of the predetermined time interval; and disabling, by the payment card biometric authenticator, the use of the payment card when the authentication has expired.

15. The method of claim 14, the method further comprising:

receiving, via the communication interface of the payment card, a user input that relates to specifying an amount of time as the predetermined time interval.

16. The method of claim 10, wherein the account information includes at least one from among a cardholder name, an account number, an expiration date of the payment card, and a security code associated with the payment card.

17. The method of claim 10, wherein the predetermined time interval is less than or equal to 60 seconds.

18. A non-transitory computer readable storage medium storing instructions for executing a transaction by using an account, wherein the storage medium comprises first set of executable codes of the instructions which, when executed by at least one processor of the payment card, causes the at least one processor of the payment card to:

capture, via a sensor of the payment card, biometric information of a user;

facilitate, via a communication interface of the payment card wireless communication with a mobile smart phone;

transmit, via the communication interface of the payment card, a first request for a first proposed transaction to a mobile smart phone, wherein the first proposed transaction is to be executed by using the payment card;

wherein the storage medium comprises second set of executable codes of the instructions which, when executed by a processor of the payment card biometric authenticator, cause the processor to:

receive the first request for the first proposed transaction to be executed by using the payment card, wherein the payment card biometric authenticator stores account information of an authorized user;

wherein the first set of executable codes of the instructions which, when executed by the at least one processor of the payment card, further cause the at least one processor to:

receive, via the communication interface of the payment card, the captured biometric information including first biometric information of a first user;

wherein the second set of executable codes of the instructions which, when executed by the processor of the payment card biometric authenticator, further cause the processor to:

determine whether the first biometric information of the first user matches biometric information of the authorized user stored in a database by comparing the first biometric information of the first user with the stored biometric information of the authorized user;

based on a determination that the first biometric information of the first user matches the stored biometric information of the authorized user, authenticate a first use of the payment card for the first proposed transaction by authorizing the first request for the first proposed transaction;

transmit the authentication of the first use of the payment card for the first proposed transaction to the payment card to authorize the displaying of the account information of the authorized user for a predetermined time interval;

compare first account data stored on the mobile smart phone with the account information that relates to the payment card, wherein the comparing the first account data further comprises validating the first account data;

wherein the first set of executable codes of the instructions which, when executed by the at least one processor of the payment card, further cause the at least one processor to:

receive, via the communication interface of the payment card, the authentication of the first use of the payment card to execute the proposed transaction; and display, via a display area of the payment card, the account information for the predetermined time interval based on the receiving of the authentication, and wherein the display area hides the account information when the payment card has not been authenticated.

19. The storage medium of claim 18, wherein when the use of the payment card is authenticated, the second set of executable codes of the instructions, when executed by the processor, further causes the processor to:

cause the authentication to expire after an elapsement of the predetermined time interval; and disable the use of the payment card when the authentication has expired.

* * * * *